United States Patent [19]

Prignitz

[11] Patent Number: 4,981,427
[45] Date of Patent: Jan. 1, 1991

[54] DOUBLE BELT MOULDING MACHINE

[76] Inventor: Herbert Prignitz, Papyrusweg 12, D-2000 Hamburg 74, Fed. Rep. of Germany

[21] Appl. No.: 455,841

[22] Filed: Dec. 21, 1989

Related U.S. Application Data

[63] Continuation of Ser. No. 884,348, Jul. 11, 1986, abandoned.

[30] Foreign Application Priority Data

Jul. 17, 1985 [EP] European Pat. Off. ........ 85108944.1

[51] Int. Cl.⁵ .............................................. B29C 39/16
[52] U.S. Cl. .................................... 425/162; 425/335; 425/371; 425/817 C
[58] Field of Search ................. 156/583.5; 100/93 RP, 100/151, 154, 155; 264/45.8, 46.2, 40.7, 109; 425/150, 162, 335, 367, 371, 372, 324.1, 4 C, 817 C

[56] References Cited

U.S. PATENT DOCUMENTS

| | | | |
|---|---|---|---|
| 3,381,609 | 5/1968 | Malarkey, Jr. ....................... | 100/154 |
| 3,887,314 | 6/1975 | Andresen et al. .................... | 425/371 |
| 3,957,413 | 5/1976 | Lieberman ........................... | 425/371 |
| 4,178,144 | 12/1979 | Tabler ................................. | 425/372 |
| 4,265,608 | 5/1981 | Tunador et al. ..................... | 425/371 |
| 4,371,414 | 2/1983 | Ahrweiler ........................... | 425/372 |
| 4,375,350 | 3/1983 | Sato ................................... | 425/371 |
| 4,506,200 | 3/1985 | Dätwyler et al. ................... | 318/338 |
| 4,559,990 | 12/1985 | Greilinger et al. ................. | 425/367 |
| 4,589,948 | 5/1986 | Held ................................... | 425/371 |

FOREIGN PATENT DOCUMENTS

| | | |
|---|---|---|
| 2018629 | 12/1971 | Fed. Rep. of Germany ... 425/817 C |
| 2922152 | 12/1980 | Fed. Rep. of Germany . |
| 3018357 | 11/1981 | Fed. Rep. of Germany . |
| 2254431 | 7/1975 | France . |
| 1048268 | 11/1966 | United Kingdom . |
| 2053824 | 2/1981 | United Kingdom . |

Primary Examiner—Jill L. Heitbrink
Attorney, Agent, or Firm—Antonelli, Terry, Stout & Kraus

[57] ABSTRACT

The invention relates to a double belt moulding machine for producing foamed plastic plates as a continuous strand. Two endless conveyor belts are moved in opposite rotation directions. The belts can be in the form of straps, steel strips, plate belts, etc., which are each guided over one drive pulley or drive sprockets in the case of plate belts, support elements in the form of slideways or slide rails and a guide pulley or sprocket. According to the invention the drive pulleys or sprockets for the two belts are provided with individual electric drives regulated to synchronize of the facing belt sections. Thus, destructive shear forces within the foam strand in the mould channel are avoided.

9 Claims, 1 Drawing Sheet

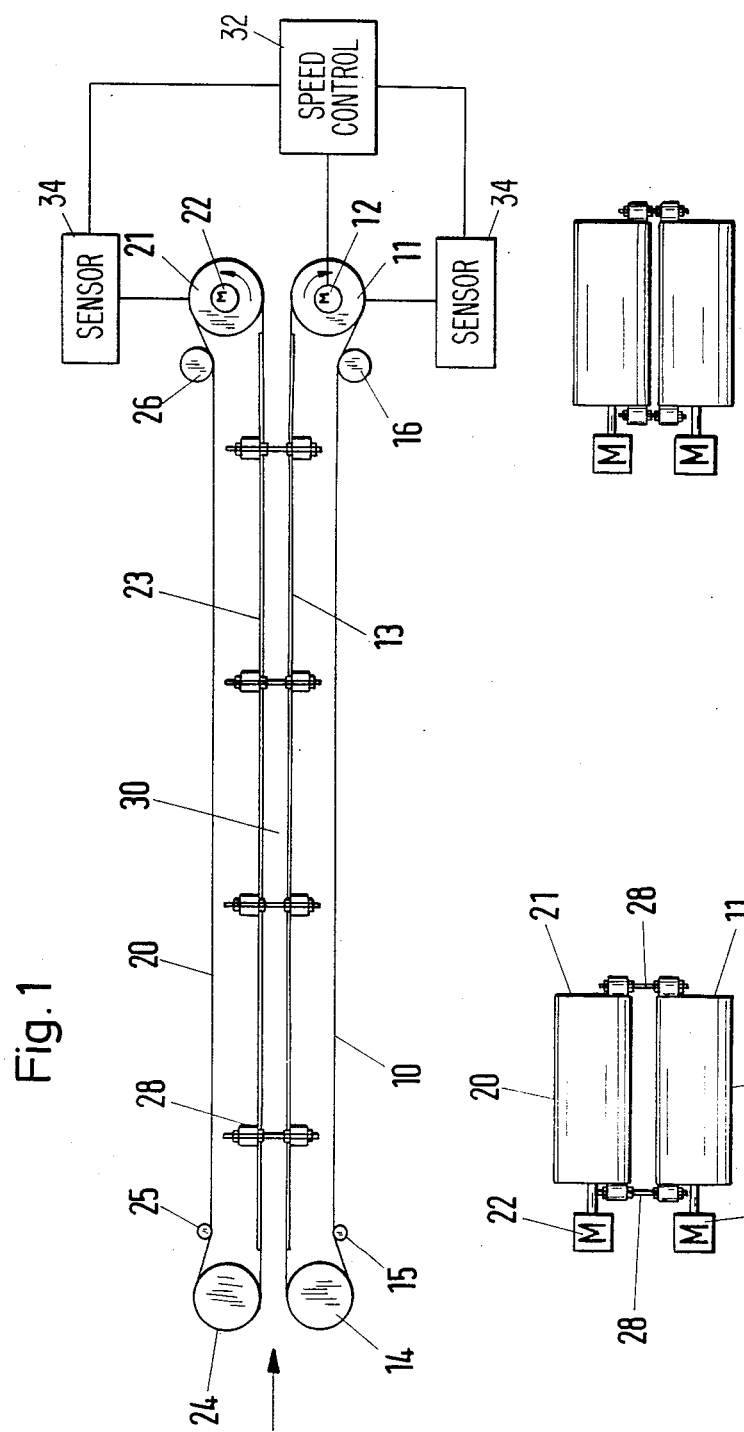
Fig. 1
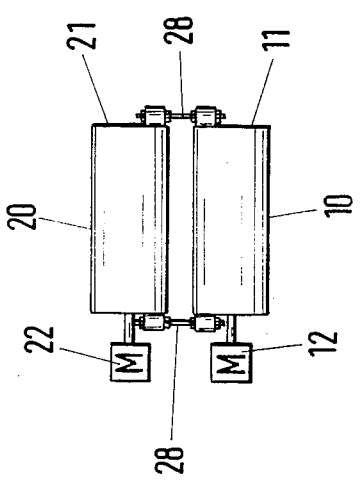
Fig. 2
Fig. 3

DOUBLE BELT MOULDING MACHINE

This application is a continuation of application Ser. No. 06/884,348, filed July 11, 1986 now abandoned.

BACKGROUND OF THE INVENTION

The invention relates to a double belt moulding machine for the production of foamed plastic plates in a continuous strand. The machine has two endless conveyor belts that rotate in opposite directions. These can for example be straps or steel strips, which are guided over a drive pulley, slideways serving as support elements and around a guide pulley. The conveyor belts can also be plate belts, which are guided over drive and guide sprocket wheels and which are equipped with support rollers, which can run along support elements in the form of guide rails. The two facing, parallel sections of the two belts running in the same direction define the two flat sides of the zone used for continuous foamed plastics strand moulding. The two narrow sides of this zone can be also bounded by circulating side belts or by fixed side rails, whose position is adjustable.

In the hitherto known constructions of such double belt moulding machines, the conveyor belts were driven by a common electric drive motor coupled with the belts by drive pulleys or sprocket wheels. A precise synchronism of the active belt sections defining the moulding zone could therefore not be obtained or could only be obtained by considerable expenditure on mechanical means. However, synchronism of the belt sections is very important, because the formation of shear forces in the foamed material strand, which could destroy its fine structure, must be avoided. It is difficult to fulfill this requirement, because synchronism of the active belt sections and uniformity of the tensile forces transferred by the belt sections to the material of the foamed plastic strand are dependent on varied and not readily controllable parameters. Thus, for example, slip can occur in the case of the friction-based transfer of torque from the drive pulleys to the straps or steel strips. In addition, varying divergences in the diameters of the drive pulleys can occur due to contamination or abrasion. The tensile forces can also be influenced by contamination of the support plates of the conveyor belts. Furthermore a stressing action is exerted by the weight of the belt sections defining the mould channel at the top and bottom and the weight of the materials introduced into the channel, particularly the foam material, together with its coatings and supports, on the lower belt section and its support plate, which leads to an increase on the tensile force in the lower belt. In addition, the force of the mixture foaming in the mould channel stresses both the lower and upper belt sections. Immediate compensation is necessary for all the effects disturbing the uniformity of the tensile forces in the active belt sections.

In addition, vertical adjustability of the upper belt is required to provide for the production of foamed plastic plates of different thicknesses. The provision of such a vertical adjustability is extremely difficult on the basis of purely mechanically adjustable coupling means between the drive motor and drive pulleys or the sprocket wheels of the belts.

SUMMARY OF THE INVENTION

The present invention solves the problem of providing a double belt moulding machine of the aforementioned type in which, by using simple means, it is possible to avoid the formation of harmful shear forces within the foamed material strand in the mould channel.

According to the invention this problem is solved in that in the case of double belt moulding machines of the aforementioned type, the drive pulleys or sprocket wheels of the two belts are provided with individual electric drives regulated to provide synchronism of the facing belt sections.

In the case of such a double belt moulding machine, it is possible in a simple manner, both when starting and during operation, to achieve such a precise synchronism of the active belt section bounding the mould channel and therefore the foamed plastic strand, as well as uniformity of the tensile forces transferred by the belt sections to said strand, that harmful shear forces cannot occur therein. Complicated and sensitive mechanical force transfer members, such as those required for transmitting torque from a common drive motor to drive pulleys are no longer necessary. Another advantage of the invention is that the prerequisite is provided for a particularly simple change to the spacing of the facing belts, because the pulleys or sprockets carrying the upper circulating belt can be arranged in a vertically adjustable manner together with the individual drive motor of the upper belt.

Advantageous developments of the invention are characterized in the subclaims.

BRIEF DESCRIPTION OF THE DRAWINGS

The invention is described hereinafter relative to the drawings, wherein:

FIG. 1 is a side diagrammatic view of the essential parts of a double belt moulding machine according to the invention.

FIG. 2 depicts, viewed in the belt running direction, the vertically adjustable arrangement of the belts with a relatively large spacing.

FIG. 3 depicts the same arrangement in the case of a relatively small spacing of the belts.

DETAILED DESCRIPTION OF THE PREFERRED EMBODIMENT

In FIG. 1 the lower endless conveyor belt is 10 and the upper belt 20. Each of these conveyor belts is guided over a drive pulley 11 or 21. Each of the drive pulleys is directly coupled to an individual electric drive motor 12, 22 and can be driven in opposite rotation directions, as indicated by the arrows. The directly facing belt sections are guided over plate-like support elements 13, 23, which form slideways, as well as over guide pulleys 14, 24 and rollers 15, 16 or 25, 26. The guide pulleys or rollers can also be constructed as tension pulleys for belts 10, 20.

The space 30 between the sections of belts 10, 20 supported by support elements 13, 23 is used for moulding the continuous foamed plastic strand which, after leaving the machine, can be subdivided into the desired length for producing foamed plastic plates. This channel-like space is bounded at its two flat sides by the active sections of belts 10, 20. The two narrow sides of this mould channel can be closed by boundaries in the form of circulating or revolving side belts, or fixed adjustable side rails (not shown). The foamable plastic mixture is introduced in mould channel 30 at one end of the machine, as indicated by an arrow in FIG. 1. The material fills the cross-section thereof on foaming and solidifies during passage therethrough.

In the preferred embodiment, adjusting devices 28 with lifting spindles or the like are arranged at intervals on either side of the mould channel. They function to uniformly modify the spacing of the upper belt 20, together with the associated support plates 23 and all the other drive and guidance means associated therewith with respect to the lower belt 10, to determine the height of mould channel 30 and consequently the thickness of the foamed plastic plates to be produced. FIGS. 2 and 3, which show the machine in the belt running direction, illustrate two different height positions of the upper belt and the parts associated therewith with respect to the lower belt and the parts associated therewith. In FIG. 2, the height of mould channel 30 is greater than that in FIG. 3. Since the drive pulleys 11, 21 are provided with individual drive motors 12, 22, it is possible to construct the upper belt 20 with all its driving and guidance means as a common unit that may be raised and lowered by means of lifting devices 28 without the need for complicated adjustable transmissions between the drive pulleys of the two belts and a drive motor common thereto. There is no variance between the speeds of the upper and lower belts causing changing tension. This is because it is possible to regulate the individual drive motors of both belts to provide synchronism or uniformity of the tensile forces in both belts by relatively simple means, e.g. three-phase or alternating current motors controllable by frequency changes. The synchronism control, for example, can by means of controller 32 be a function of changes in the torque or power consumption of the motors or a function of the belt speeds sections, as sensed by sensors 34.

However, the construction of a double belt moulding machine according to the invention is not limited to the aforementioned embodiment. For instance, electric individual drive direct current motors may be used, such as d.c. shunt-wound, d.c. series-wound and d.c. compound-wound motors.

I claim:

1. A double belt moulding machine for producing foamed plastic panels as a continuous strand of material, said machine comprising:
    a first conveyor assembly, including a first endless belt and a first driving motor for driving said first endless belt in a first direction;
    a second conveyor assembly, including a second endless belt and a second driving motor for driving said second endless belt in a second direction;
    means positioning said first and second conveyor assemblies with a longitudinal surface of said first endless belt facing and spaced from a longitudinal surface of said second endless belt to define a space therebetween for receiving and shaping the material, with said facing surfaces moving in the same longitudinal direction when said first driving motor drives said first endless belt in the first direction and said second driving motor drives said second endless belt in the second direction;
    means for adjusting the position of one of said conveyor assemblies to adjust the size of the space between the longitudinal surfaces of said first and second endless belts;
    means for sensing the torque of each of said first and second driving motors; and
    means responsive to the sensed torque of said first and second driving motors for maintaining the speeds of said first and second endless belts substantially equal to move said two facing surfaces in synchronism.

2. A double belt moulding machine for producing foamed plastic panels as a continuous strand of material, said machine comprising:
    a first conveyor assembly, including a first endless belt and a first driving motor for driving said first endless belt in a first direction;
    a second conveyor assembly, including a second endless belt and a second driving motor for driving said second endless belt in a second direction;
    means positioning said first and second conveyor assemblies with a longitudinal surface of said first endless belt facing and spaced from a longitudinal surface of said second endless belt to define a space therebetween for receiving and shaping the material, with said facing surfaces moving in the same longitudinal direction when said first driving motor drives said first endless belt in the first direction and said second driving motor drives said second endless belt in the second direction;
    means for adjusting the position of one of said conveyor assemblies to adjust the size of the space between the longitudinal surfaces of said first and second endless belts;
    means for sensing the power consumption of each of said first and second driving motors; and
    means responsive to the sensed power consumption of said first and second driving motors for maintaining the speeds of said first an second belts substantially equal to move said two facing surfaces in synchronism.

3. A double belt moulding machine for producing foamed plastic panels as a continuous strand of material, said machine comprising:
    a first conveyor assembly, including a first endless belt and a first driving motor for driving said first endless belt in a first direction;
    a second conveyor assembly, including a second endless belt and a second driving motor for driving said second endless belt in a second direction;
    means positioning said first and second conveyor assemblies with a longitudinal surface of said first endless belt facing and spaced from a longitudinal surface of said second endless belt to define a space therebetween for receiving and shaping the material, with said facing surfaces moving in the same longitudinal direction when said first driving motor drives said first endless belt in the first direction and said second driving motor drives said second endless belt in the second direction;
    means for adjusting the position of one of said conveyor assemblies to adjust the size of the space between the longitudinal surfaces of said first and second endless belts;
    means for sensing the speeds of said first and second endless belts; and
    means responsive to the sensed speeds of said first and second endless belts for maintaining the speeds of said first and second endless belts substantially equal to move said two facing surfaces in synchronism.

4. A machine according to claim 1, 2, or 3, wherein each of said driving motors comprises a direct current electric motor.

5. A machine according to claim 4, wherein said direct current electric motors are shunt-wound motors.

6. A machine according to claim 4, wherein said direct current electric motors are series-wound motors.

7. A machine according to claim 4, wherein said direct current electric motors are compound-wound motors.

8. A machine according to claim 1, 2, or 3, wherein each of said driving motors comprises a three-phase alternating current electric motor regulatable by frequency changes.

9. A machine according to claim 1, 2, or 3, wherein each of said driving motors comprises an alternating current electric motor regulatable by frequency changes.

* * * * *